United States Patent [19]

Myers et al.

[11] Patent Number: 5,272,752
[45] Date of Patent: Dec. 21, 1993

[54] AUTHORIZATION CODE LOCKOUT MECHANISM FOR PREVENTING UNAUTHORIZED RECEPTION OF TRANSMITTED DATA

[75] Inventors: Howard L. Myers; Lee R. Johnson, both of Lawrenceville, Ga.

[73] Assignee: Scientific-Atlanta, Inc., Norcross, Ga.

[21] Appl. No.: 851,582

[22] Filed: Mar. 16, 1992

[51] Int. Cl.⁵ .............................. H04L 9/02
[52] U.S. Cl. ........................ 380/23; 380/20; 380/21; 380/25; 340/825.34; 340/825.5
[58] Field of Search ............... 380/20, 21, 23, 25; 358/86; 340/825.31, 825.32, 825.33, 825.34, 825.5

[56] References Cited

U.S. PATENT DOCUMENTS

| | | | |
|---|---|---|---|
| 3,924,075 | 12/1975 | Gannett | 380/23 |
| 4,476,488 | 10/1984 | Merrell | 358/86 |
| 4,484,027 | 11/1984 | Lee et al. | 380/21 |
| 4,531,021 | 7/1985 | Bluestein et al. | 380/20 |
| 4,578,531 | 3/1986 | Everhart et al. | 380/21 |
| 4,712,239 | 12/1987 | Frezza et al. | 380/20 |
| 4,736,422 | 4/1988 | Mason | 380/20 |
| 4,786,229 | 8/1988 | Benjamin et al. | 380/20 |
| 4,803,725 | 2/1989 | Horne et al. | 380/44 |
| 4,887,296 | 12/1989 | Horne | 380/21 |
| 4,922,537 | 5/1990 | Frederiksen | 381/31 |
| 4,933,971 | 6/1990 | Bestock et al. | 380/44 |
| 4,937,866 | 6/1990 | Crowther et al. | 380/20 |
| 4,944,006 | 7/1990 | Citta et al. | 380/20 |
| 4,972,472 | 11/1990 | Brown et al. | 380/21 |
| 4,995,080 | 2/1991 | Bestler et al. | 380/21 |
| 5,081,677 | 1/1992 | Green et al. | 380/21 |
| 5,091,938 | 2/1992 | Thompson et al. | 380/21 |

Primary Examiner—Salvatore Cangialosi
Attorney, Agent, or Firm—Frederick W. Powers, III

[57] ABSTRACT

A system and method for using two simple transactions to enable the disconnection of unauthorized receiver terminals. This is accomplished in accordance with the invention by sending an addressed transaction to every known valid receiver terminal giving each one the current authorization code. After this command has been sent several times to each valid receiver terminal, a global transaction is sent to all terminals containing the current and previous authorization codes. If any receiver terminal receiving this transaction does not find a match between its stored authorization code and either of the transmitted authorization codes, it will deauthorize itself. Once into the transmission cycle, the current authorization code will become the previous authorization code and a new authorization code will be generated. The global command will be sent periodically while all the valid receiver terminals are updated with the new authorization code. Since the global command is constantly sent for checking the receiver terminals to see if they are valid and disconnecting unauthorized receiver terminals, it is not necessary in accordance with the invention to provide a send authorization phase and a check authorization phase for purposes of disconnecting unauthorized receiver terminals as in the prior art.

9 Claims, 3 Drawing Sheets

ID LOCKOUT MECHANISM FOR PREVENTING UNAUTHORIZED RECEPTION OF TRANSMITTED DATA

SUMMARY OF THE INVENTION

1. Field of the Invention

The present invention relates to a system and method for preventing unauthorized reception of transmitted data, and more particularly, to a system and method for disabling individually addressable receivers in a communications network when they are not authorized to receive a particular data transmission.

2. Description of the Prior Art

Many different techniques are used in the prior art for restricting access to transmitted data. For example, a system manager may control access to a data communications system by transmitting a start command followed by a command addressing all authorized receivers and then an end command signalling the end of the authorization test. However, such an approach requires all receivers to receive the start and end commands. Unfortunately, if either the start or end command is not received for any reason, the authorization test will not accomplish the desired goal of disabling illegal receivers. In particular, if either the send authorization command or the check authorization command are not received, then an illegal receiver may not be appropriately disabled.

Other techniques validate or invalidate a receiver by using cryptographic keys which encipher and decipher the transmitted data. Access to the transmitted data is limited in that only valid receivers have the required keys for deciphering the transmitted information. However, such systems are often quite difficult to use because of the difficulty of providing new cryptographic keys at periodic intervals so as to control access to certain transmitted data.

Numerous systems have been proposed to keep track of the current cryptographic key. For example, Green et al. disclose in U.S. Pat. No. 5,081,677 a technique whereby version numbers of enciphering master keys are maintained so that the data being deciphered can be deciphered with the appropriate version of the master key. Similarly, Brown et al. disclose in U.S. Pat. No. 4,972,472 a system for allowing transmitted data to be deciphered either by a current cryptographic key or a previous cryptographic key which is stored in a "retired" area, while Citta et al. disclose in U.S. Pat. No. 4,944,006 a transmission system in which each authorized subscriber terminal has a memory for storing a number of global decryption keys which are cycled through in attempts to decrypt the global transmission packets. Citta et al. provide a permanent default key associated with the subscriber terminal to assure that communication with that terminal is possible despite a lack of knowledge of the terminal's address or the other global decryption keys in its memory. Thus, Citta et al. allow a number of attempts to match a session decryption key in the subscriber terminal memory.

Other prior art systems prevent unauthorized reception by using one or more changeable encrypting keys to encrypt the transmitted data. Such systems include, for example, U.S. Pat. No. 4,995,080 to Bestler et al.; U.S. Pat. No. 4,933,971 to Bestock et al.; U.S. Pat. No. 4,887,296 to Horne; U.S. Pat. No. 4,803,725 to Horne et al.; U.S. Pat. No. 4,736,422 to Mason; U.S. Pat. No. 4,578,531 to Everhart et al.; U.S. Pat. No. 4,531,021 to Bluestein et al.; U.S. Pat. No. 4,484,027 to Lee et al.; and U.S. Pat. No. 3,924,075 to Gannett. U.S. Pat. No. 4,712,239 to Frezza et al. further discloses the use of a booter checksum for use in enabling a data descrambler. However, none of these systems provide a simple mechanism for checking whether a receiver terminal is authorized for a particular data transmission and then disabling the receiver terminal if it is not authorized for the transmission. In particular, none of these prior art schemes discloses a simple technique in which an unauthorized terminal is disabled yet valid terminals are not disabled simply because of a failure to receive a particular transmission.

Accordingly, a simple system is desired for preventing unauthorized reception of information or services while also being careful not to disable valid receiver terminals simply because of a failure to receive a particular transmission. Also, it is desired to disconnect unauthorized terminals without requiring the complicated cryptographic key systems of the prior art. The present invention has been designed to meet these needs.

SUMMARY OF THE INVENTION

The present invention solves the aforementioned problems in the prior art by providing a system which uses only two transactions to enable the disconnection of unauthorized receiver terminals. This is accomplished in accordance with the invention by sending an addressed transaction to every known valid receiver terminal giving each receiver terminal the current "authorization code". After this command has been sent several times to each valid receiver terminal, a global transaction is sent to all receiver terminals containing the current and previous authorization codes. If any receiver terminal receiving this transaction does not find a match between its stored authorization code and either of the transmitted authorization codes, it will disable itself.

Once into a transmission cycle, the current authorization code of the present invention will become the previous authorization code and a new authorization code will be generated. The global command will be sent periodically while all the valid receiver terminals are being updated with this new authorization code. Thus, by using only current and previous authorization codes in conjunction with the constant sending of a global command to disconnect unauthorized receiver terminals, a send authorization phase and a check authorization phase are not necessary. As a result, a valid receiver terminal will not disable itself merely because of a faulty transmission of the send authorization phase signal or the check authorization phase signal.

The present invention is designed for use in any communications network having individually addressed units where data access needs to be restricted. A preferred embodiment of such a system for preventing unauthorized reception of a transmitted signal in accordance with the invention preferably comprises means for generating a signal for transmission, a system manager, means for transmitting the signal and terminal authorization and terminal check commands, and a terminal. Typically, the terminal receives the transmitted signal and the terminal authorization and terminal check commands, stores a new authorization code received in a terminal authorization command as a terminal authorization code, compares the terminal authorization code to a new authorization code and a previous authorization code in a received terminal check command, and disables itself when the terminal authorization code does not match either the new authorization code or the previous authorization code in the received terminal check command. On the other hand, the system manager preferably generates a terminal authorization command containing a new authorization code at predetermined intervals for transmission with the signal, saves a previous authorization code, and generates a terminal check command containing the new authorization code and the previous authorization code for transmission with the signal. Hence, a terminal disables itself in response to a command from the system manager when the terminal's stored authorization code does not match the current or previous authorization code which is transmitted to all receiver terminals.

In accordance with a particular embodiment of the invention, a multiplexer is provided for multiplexing the terminal authorization and terminal check commands with the signal prior to transmission by the transmitting means. In addition, the system manager preferably also generates a terminal enable command for transmission with the signal so as to enable a particular terminal. In addition, each terminal preferably comprises a discriminator for discriminating the terminal authorization and terminal check commands from the signal, a terminal authorization code register for storing the terminal authorization code, a comparator for comparing the terminal authorization code to the new authorization code and the previous authorization code in the received terminal check command, and means for disabling further processing of the signal when the terminal authorization code does not match either the new authorization code or the previous authorization code in the received terminal check command.

The scope of the invention further includes a method of preventing unauthorized reception of a transmitted signal, comprising the steps of:

transmitting, at predetermined intervals, a terminal authorization command containing a new authorization code for storage in a plurality of terminals as a terminal authorization code;

setting a previous authorization code equal to the new authorization code;

transmitting, at predetermined intervals, a terminal authorization command containing another new authorization code for storage in the plurality of terminals as the terminal authorization code;

transmitting, at predetermined intervals, a terminal check command containing the another new authorization code and the previous authorization code to the plurality of terminals;

at each terminal, comparing the terminal authorization code to the another new authorization code and the previous authorization code in the terminal check command; and disabling a particular terminal when its terminal authorization code does not match either the another new authorization code or the previous authorization code in the terminal check command.

BRIEF DESCRIPTION OF THE DRAWINGS

The above and other features and advantages of the present invention will be readily apparent to those of ordinary skill in the art in view of the accompany drawings, of which.

DETAILED DESCRIPTION OF THE PRESENTLY PREFERRED EMBODIMENTS

A system with the above-mentioned beneficial features in accordance with a presently preferred exemplary embodiment of the invention will now be described with reference to FIGS. 1-5. It will be appreciated by those of ordinary skill in the art that the description given herein with respect to those figures is for exemplary purposes only and is not intended in any way to limit the scope of the invention. For example, although the present invention will be described in connection with the transmission of digital audio signals as in U.S. patent application Ser. No. 07/618,744 and U.S. Pat. No. 4,922,537, the contents of which are hereby incorporated by reference, those skilled in the art will appreciate that the techniques of the invention may also be used in any communications network, such as a closed circuit video or a cable television network, having individually addressed units where data access needs to be restricted. However, those skilled in the art will appreciate that many other systems, such as speech transmission systems, may incorporate the present invention as well. Accordingly, all questions regarding the scope of the invention should be resolved by referring to the appended claims.

The present invention is preferably designed for use in a communications network in which each receiver terminal in the system contains a unique digital address which may be set at the factory. Typically, a system manager is provided which is responsible for keeping track of each valid receiver terminal in the system and periodically sending an addressed transaction containing the current authorization code to every known valid receiver terminal in the system. Once all units have been loaded with the current authorization code, the system manager of the invention begins transmitting a global transaction containing the current and previous authorization codes. All units receiving the global transaction including the current and previous authorization codes then check their local copy of the authorization code against the current and previous authorization codes sent with the global command and deauthorize themselves if no match is found. Once this cycle has been started, the global transaction can be sent out as frequently as desired. Also, authorization codes can be changed as quickly as the entire population of terminals can be cycled through, although those skilled in the art will appreciate that it is not generally desirable to change authorization codes too frequently due to the possibility of missed transactions.

Such a system will now be described with particularity with respect to FIGS. 1-5.

Figure 1:
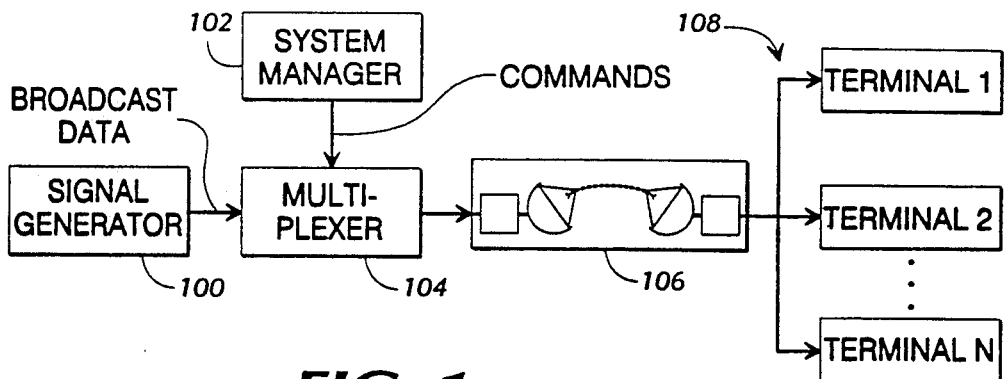
FIG. 1 illustrates a block diagram of a communications network to which access is restricted in accordance with the present invention.

FIG. 1 illustrates a system block diagram of a communications system embodying the present invention. As illustrated, a communications system in accordance with the invention preferably includes a signal generator 100 for generating broadcast data which is combined with subscriber control command data from a system manager 102 in a digital multiplexer 104. The combined data signals are then transmitted via a transmission and receiving system 106, and the received demodulated signals are then received at a plurality of receiver terminals 108. A preferred embodiment of such a transmission system is described in the aforementioned U.S. patent application Ser. No. 07/618,744. As described therein, the signal generator 100 comprises a plurality of compact disc players which provide output audio signals which are transmitted with their associated title, track and author information via a satellite transmission and cable distribution system to a plurality of digital audio music terminals connected at the receiver end of the cable distribution system. As further described therein, the transmitted digital audio signals are preferably transmitted in a compressed data format such as that described in the aforementioned U.S. Pat. No. 4,922,537. Although the present invention is ideally incorporated into such a system to prevent pirating of the transmitted digital audio signals, those skilled in the art will appreciate that the present invention may be incorporated into speech, video or any other transmission system to which access is limited.

Hence, the system of FIG. 1 preferably broadcasts digital audio data along with subscriber control information from system manager 102 over the transmission and reception network 106 for reception by each of the individual terminals 108. In accordance with the invention, each of the terminals 108 must be authorized to receive the transmitted data or else it will disable itself. This is controlled by system manager 102, which contains information on the various subscribers who may receive the digital audio or video data which is to be transmitted. During operation, this subscriber information is stored in system manager 102 and multiplexed with the digital audio and program data signals in multiplexer 104 as previously described so as to produce a serial digital data stream containing the digital audio and title, track and author information as well as the subscriber information. This transmitted information is then transmitted and received by each of the individual terminals 108 and processed for listening at the receiver via the subscriber's stereo (or television) system.

Figure 2A:
FIGS. 2A-2C illustrate the respective data formats of a store, compare and enable command issued by system manager 102 of the embodiment of FIG. 1.
Figure 2B:
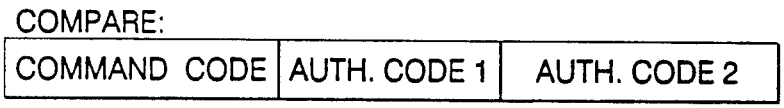
Figure 2C:
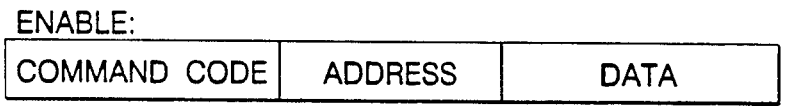

System manager 102 controls subscribers to the system of FIG. 1 by issuing a plurality of subscriber control commands. As illustrated in FIGS. 2A-2C, these commands include an addressable store command (FIG. 2A) which contains the new authorization code, a global compare command (FIG. 2B) which contains a current and previous authorization code, and an addressable enable command (FIG. 2C) which enables new terminals 108 added to the system or reenables previously disabled terminals 108.

During operation, system manager 102 transmits a store command containing the new authorization code to a new terminal and then issues an enable command to activate that terminal 108 so that it may receive subsequently transmitted data. A new authorization code is then stored in each terminal 108 which has its address specified in subsequent store commands. The authorization code in the store command is preferably changed at periodic intervals so that access by those subscribers who have not paid the requisite fee for receiving the broadcast signal may be prevented. For example, each week a new authorization code may be transmitted which is received by each of the authorized terminals 108. This new authorization code is then stored in each terminal 108 as its current authorization code. As will be described below, access will be denied a particular terminal 108 after a week if it has not received the latest authorization code.

Periodically, system manager 102 issues to all terminals 108 a global compare command to determine whether a particular terminal 108 is authorized to receive the transmitted signal. Such a compare command includes the previous authorization code and the most recent authorization code. When this compare command is received by each respective terminal 108, that terminal 108 checks its current authorization code with the previous and new authorization codes received in the global compare command, and if a match is found, that terminal is allowed to remain enabled. However, if no match is found, that terminal disables itself.

Figure 3:
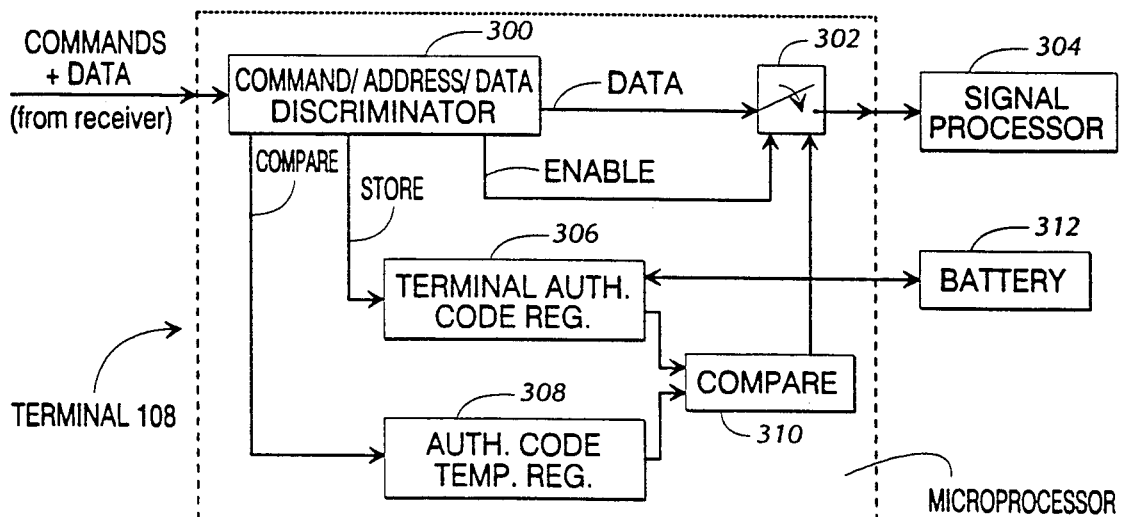
FIG. 3 illustrates a block diagram of a preferred embodiment of terminal 108 of the embodiment of FIG. 1.

As illustrated in FIG. 3, each terminal 108 comprises a command/address/data discriminator 300 which separates the subscriber commands inserted into the serial data stream by system manager 102 from the audio or video data and the like inserted into the digital data stream by signal generator 100 and determines whether that terminal is designated by the address field in the command. If the terminal 108 is enabled when the audio or video data is received, the audio or video data is passed through a switch 302 to a signal processor 304 for processing and subsequent display and/or listening by the subscriber. As will be described below, switch 302 is closed when the terminal 108 is enabled and is opened when terminal 108 is disabled.

When an enable command is detected by command/data discriminator 300, an enable signal is sent to switch 302 authorizing the switch 302 to close so as to allow signal processing at signal processor 304. The terminal 108 then remains active until disabled as described herein. On the other hand, when a store command is detected, the new authorization code transmitted in the store command is stored in terminal authorization code register 306 as the current authorization code for that particular terminal 108. Terminal authorization code register 306 keeps this value as its current authorization code until a subsequent store command is received. Then, when a global compare command is detected, the current and previous authorization codes in the global compare command are temporarily stored in authorization code temporary register 308. The current authorization code value stored in terminal authorization code register 306 is then compared to each of the respective previous and new authorization codes stored in the authorization code temporary register 308 at comparator 310. If a match is found, switch 302 remains closed so as to allow subsequent signal processing by signal processor 304. However, when no match is found, comparator 310 outputs a disable signal which opens switch 302, thereby disabling terminal 108 from further signal processing. Terminal 108 then remains disabled until a subsequent enable command is received.

Preferably, terminal authorization code register 306 is a nonvolatile memory, but a battery 312 may also be provided to maintain the authorization code stored in terminal authorization code register 306 in the event of a power failure. As would be apparent to those skilled in the art, terminal authorization code register 306 may be implemented by way of flash memory, EEROM, EEPROM and the like.

Figure 4A:
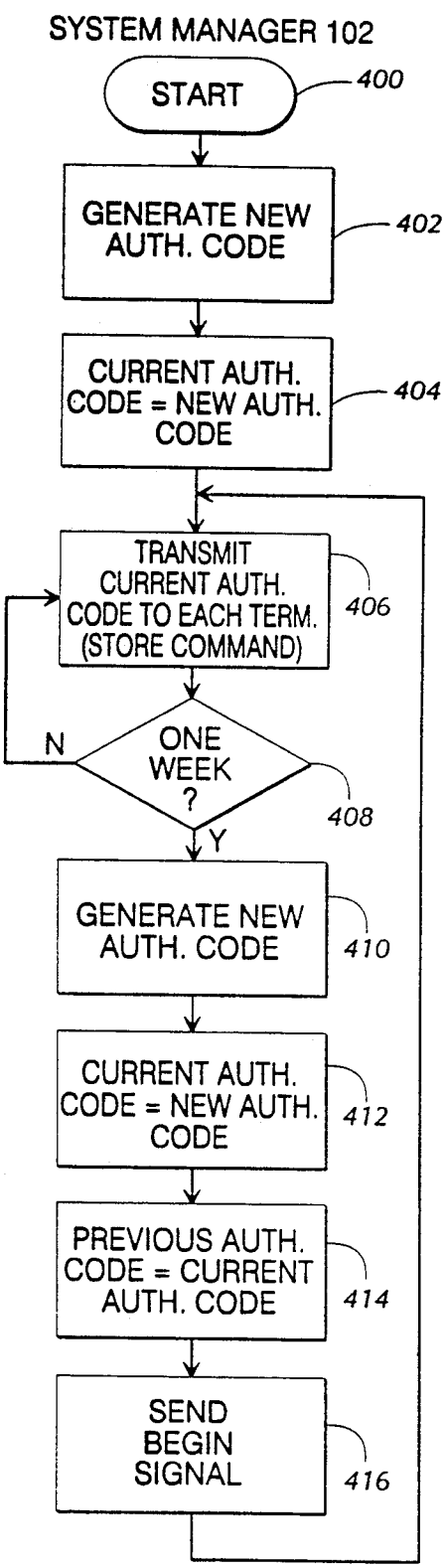
FIGS. 4A-4C are flow diagrams illustrating the operation of system manager 102 of the embodiment of FIG. 1 for preventing unauthorized reception of a data transmission in accordance with the invention.
Figure 4B:
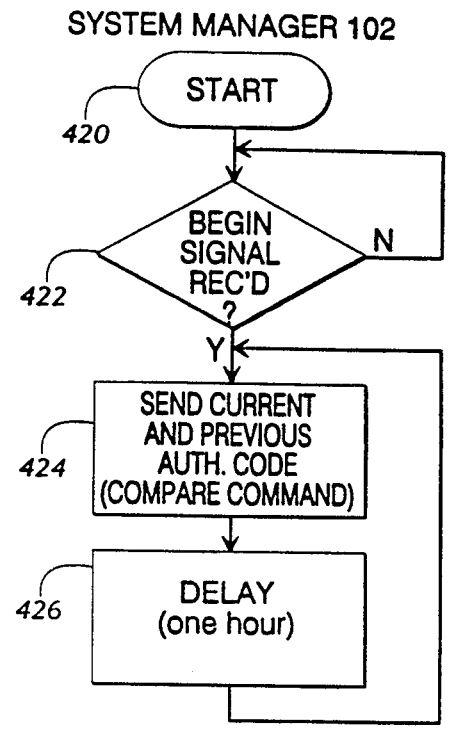
Figure 4C:
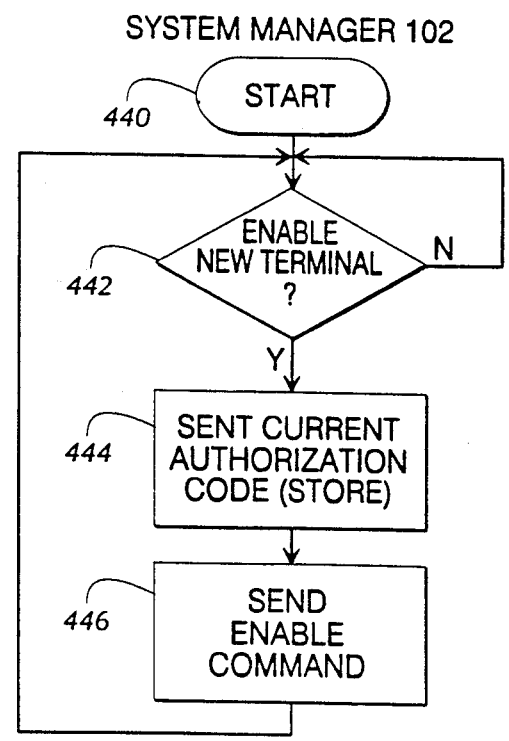

FIGS. 4A-4C respectively illustrate the operation of system manager 102 in accordance with a preferred embodiment of the invention. As illustrated, system manager 102 starts at step 400 (FIG. 4A) at power-up to generate a new authorization code at step 402. System manager 102 then sets its current authorization code equal to the new authorization code and stores this value in its current authorization code register at step 404. System manager 102 then transmits the current authorization code to each known terminal 108 at step 406 by transmitting the aforementioned store command containing the current (new) authorization code. This transmission continues for a suitable period of time to allow all of the valid receiver terminals to receive the current authorization code. For example, as illustrated at step 408, the new authorization code may be transmitted for a period of one week to enable all valid terminals 108 to receive the current authorization code. At the end of a week, all valid receiver terminals should have received the new authorization code. The current authorization code stored in the current authorization code register of the system manager 102 is then stored as a previous authorization code in a previous authorization code register of system manager 102 at step 410. System manager 102 then generates a new authorization code at step 412 and stores the new authorization code as the current authorization code in current authorization code register of system manager 102 at step 414. At step 416, system manager 102 then sends a begin signal which authorizes the start of sending of the global compare command. As would be apparent to one skilled in the art, the begin signal need only be sent during system start-up; however, the begin signal is preferably sent once per cycle and used for other functions within system manager 102 (such as memory management and the like). System manager 102 then repeats its transmission of the new authorization code until each valid terminal 108 has received the new authorization code (i.e., steps 406-416 are repeated). This process continues throughout the life of the subscriber system illustrated in FIG. 1.

As noted above, once the system manager 102 has initially assigned previous and current authorization code values, it transmits a begin signal. When this begin signal has been transmitted, another process starts at step 420 (FIG. 4B) which checks at step 422 that the begin signal has been received and then generates the aforementioned global compare command at step 424 including the current and previous authorization codes. This compare command is globally transmitted to all receiver terminals at predetermined intervals, such as one hour, as indicated at step 426. Upon receipt of this compare command, each terminal 108 checks its current authorization code value in its terminal authorization code register 306 with the new and previous authorization codes transmitted in the compare command in the manner described above with respect to FIG. 3. Those terminals 108 which do not have either the new or the previous authorization code deauthorize themselves in the manner previously described.

Alternatively, those skilled in the art will appreciate that a one hour (or any other predefined period) delay between transmission of the global compare command is not strictly necessary. For example, the global compare command may be inserted in open intervals of the serial data stream at the head end of the data transmission and receiving system 106. In addition, the begin signal may be used to set a flag in system manager 102, and this flag may be checked in each cycle to determine whether a begin signal has been received. Other such modifications will be apparent to those skilled in the art.

When a new terminal 108 is to be added to the data transmission system or a previously disabled terminal 108 is to be reenabled, system manager 102 starts at step 440 (FIG. 4C) to determine at step 442 whether a new terminal 108 is to be enabled. If so, the aforementioned store command with the current authorization code is sent to the appropriate terminal 108 at step 444 and then the aforementioned enable command is sent to that terminal 108 at step 446. In this manner, system manager 102 may keep careful track of enabled and disabled terminals 108 connected to the data transmission system, such as that described in the aforementioned U.S. application Ser. No. 07/618,744. Of course, a similar mechanism may be used to send disable commands to terminals 108 which are to be intentionally removed from the data transmission system by system manager 102.

Figure 5:
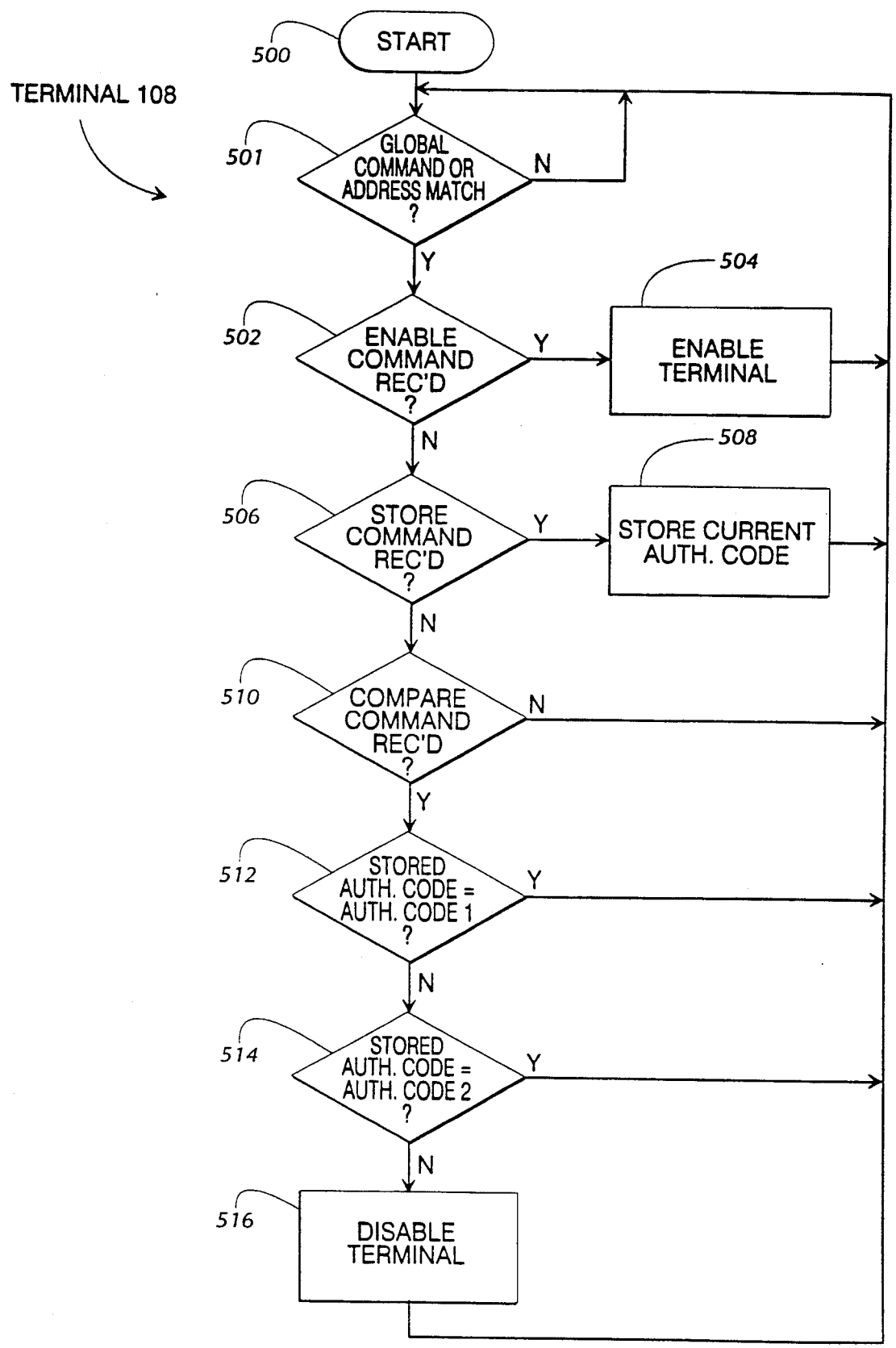
FIG. 5 is a flow diagram illustrating the operation of each terminal 108 whereby it disables itself when it does not contain the appropriate authorization code.

FIG. 5 illustrates the operation of terminal 108 in accordance with a preferred embodiment of the invention. As illustrated, each terminal 108 starts at step 500 and first checks at step 501 whether the received command is a global command or whether the address field of the received command designated that terminal. If the current terminal is to process the current command, it determines at step 502 whether an enable command has been received. If so, an enable signal is sent to switch 302 at step 504 as illustrated in FIG. 3. On the other hand, if it is determined at step 506 that a store command has been received, the new authorization code is stored in the terminal authorization code register 306 at step 508. However, if it is determined at step 510 that a compare command has been received, terminal 108 then compares its stored authorization code value stored in terminal authorization code register 306 to each of the new and previous authorization codes in the received compare command. In particular, the current authorization code value stored in terminal authorization code register 306 is compared at step 512 to authorization code 1, which may be the new authorization code, for example. If no match is found, control proceeds to step 514, where the current authorization code value stored in terminal authorization code register 306 is compared to authorization code 2, which may be the previous authorization code value. If a match is found in either of these comparisons, then that terminal 108 is considered to be an authorized terminal and control returns to step 502. However, if neither the previous nor the new authorization codes match the current authorization code stored in the terminal authorization code register 306, that terminal 108 disables itself at step 516 by opening switch 302 as previously described.

Although a single exemplary embodiment of the invention has been described in detail above, those skilled in the art will readily appreciate that many additional modifications are possible in the exemplary embodiment without materially departing from the novel teachings and advantages of the invention. For example, the system manger 102 can be placed at the receiving end (or head end) prior to retransmission of the broadcast signal over a cable network as described in the aforementioned U.S. patent application Ser. No. 07/618,744. Also, one skilled in the art will appreciate that terminal 108 may include a microprocessor which runs software for implementing the authorization code evaluation functions herein described. In addition, those skilled in the art will appreciate that the authorization code stored at each terminal 108 may or may not be used to unscramble the transmitted data in accordance with scrambling techniques of the type described by way of example in the patents listed in the background portion of the present specification. Moreover, those skilled in the art will appreciate that other mechanisms besides a simple switch may be used to disable the terminal 108. Accordingly, all such modifications are intended to be included within the scope of this invention as defined in the following claims.

We claim:

1. A system for preventing unauthorized reception of a transmitted signal, comprising:
   means for generating a signal for transmission;
   a system manager for generating a series of terminal authorization commands, each containing a new authorization code, at predetermined intervals, storing the last authorization code generated previously to each new authorization code as a previous authorization code, and generating a terminal check command containing the most recent of said new authorization codes and said previous authorization code;
   means for transmitting said signal, said terminal authorization commands to authorized terminals and said terminal check commands to all terminals; and
   a terminal for receiving said transmitted signal, said terminal authorization commands and said terminal check commands, storing each new authorization code received in said terminal authorization commands as a terminal authorization code if addressed to said terminal, comparing said terminal authorization code to said new authorization code and said previous authorization code in a received terminal check command, and disabling said terminal when said terminal authorization code does not match either said new authorization code or said previous authorization code in said received terminal check command.

2. A system as in claim 1, further comprising a multiplexer for multiplexing said terminal authorization and terminal check commands with said signal prior to transmission by said transmitting means.

3. A system as in claim 1, wherein said system manager further generates a terminal enable command for transmission with said signal so as to enable a particular terminal.

4. A system as in claim 1, wherein said terminal comprises:
   a discriminator for discriminating said terminal authorization and terminal check commands from said signal;
   a terminal authorization code register for storing said terminal authorization code;
   a comparator for comparing said terminal authorization code to said new authorization code and said previous authorization code in said received terminal check command; and
   means for disabling further processing of said signal when said terminal authorization code does not match either said new authorization code or said previous authorization code in said received terminal check command.

5. A system as in claim 4, further comprising a battery back-up for maintaining power to said terminal authorization code register in the event of a power failure.

6. A method of preventing unauthorized reception of a transmitted signal, comprising the steps of:
   transmitting, at predetermined intervals, a series of terminal authorization commands, each containing a new authorization code for storage in a plurality of authorized terminals as a terminal authorization code;
   setting a previous authorization code equal to the last of said new authorization codes prior to each new authorization code;
   transmitting, at predetermined intervals, a terminal check command containing the most recent of said new authorization codes and said previous authorization code to said plurality of authorized terminals and a plurality of unauthorized terminals;
   at each terminal, comparing said terminal authorization code to said new authorization code and said previous authorization code in said terminal check command; and
   disabling a particular terminal when its terminal authorization code does not match either said new authorization code or said previous authorization code in said terminal check command.

7. A method as in claim 6, comprising the further step of multiplexing said terminal authorization and terminal check commands with said transmitted signal for reception by said plurality of terminals.

8. A method as in claim 7, comprising the further step of discriminating said terminal authorization and terminal check commands from said transmitted signal at each of said plurality of terminals.

9. A method as in claim 6, comprising the further step of transmitting a terminal enable command so as to enable a particular terminal of said plurality of terminals.

* * * * *